(12) United States Patent
Mizohata et al.

(10) Patent No.: US 10,640,152 B2
(45) Date of Patent: May 5, 2020

(54) VEHICLE BODY SIDE PART STRUCTURE

(71) Applicant: HONDA MOTOR CO., LTD., Tokyo (JP)

(72) Inventors: Hitoshi Mizohata, Wako (JP); Takayuki Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 16/144,098

(22) Filed: Sep. 27, 2018

(65) Prior Publication Data
US 2019/0100250 A1    Apr. 4, 2019

(30) Foreign Application Priority Data

Sep. 29, 2017   (JP) ................................. 2017-191772

(51) Int. Cl.
*B62D 27/02* (2006.01)
*B62D 25/06* (2006.01)
*B62D 25/02* (2006.01)
*B62D 25/04* (2006.01)

(52) U.S. Cl.
CPC ........... *B62D 27/023* (2013.01); *B62D 25/02* (2013.01); *B62D 25/04* (2013.01); *B62D 25/06* (2013.01)

(58) Field of Classification Search
CPC ....... B62D 27/023; B62D 25/02; B62D 25/04
USPC .............. 296/203.01, 203.03, 193.06, 29, 30
See application file for complete search history.

(56) References Cited

U.S. PATENT DOCUMENTS

| | | |
|---|---|---|
| 2013/0300155 A1 | 11/2013 | Kurokawa |
| 2014/0152053 A1 | 6/2014 | Watanabe et al. |
| 2014/0232138 A1* | 8/2014 | Kanaguichi ............ B62D 25/04 296/187.12 |
| 2014/0319877 A1 | 10/2014 | Hida |
| 2015/0183471 A1 | 7/2015 | Faruque et al. |
| 2016/0186280 A1 | 6/2016 | Breidenbach et al. |

FOREIGN PATENT DOCUMENTS

| | | |
|---|---|---|
| JP | 2001-106118 A | 4/2001 |
| JP | 2012-240436 A | 12/2012 |
| JP | 2014-101016 A | 6/2014 |
| JP | 2016-002925 A | 1/2016 |
| JP | 2016-534932 A | 11/2016 |

(Continued)

OTHER PUBLICATIONS

Japanese Office Action dated Mar. 5, 2019, English translation included, 9 pages.

*Primary Examiner* — Dennis H Pedder (74) *Attorney, Agent, or Firm* — Rankin, Hill & Clark LLP (57) ABSTRACT

A vehicle body side part structure includes a side outer panel, which includes a roof side rail outer and a center pillar outer. The roof side rail outer includes a downward extension part extending downward. The downward extension part includes a pair of flange parts located at a vehicle front side and a vehicle rear side of the downward extension part, a pair of side wall parts extending outward in a vehicle width direction from the flange parts, and an extended wall part located between the side wall parts and connecting the side wall parts to each other. In this structure, lower end parts of the side wall parts and a lower end part of the extended wall part extend downward in an up-down direction of the vehicle from lower end parts of the flange parts.

9 Claims, 5 Drawing Sheets

(56) References Cited

FOREIGN PATENT DOCUMENTS

| | | |
|---|---|---|
| WO | 2012101783 A1 | 8/2012 |
| WO | 2013/008515 A1 | 1/2013 |
| WO | 2013/077083 A1 | 5/2013 |

* cited by examiner

VEHICLE BODY SIDE PART STRUCTURE

CROSS-REFERENCE TO RELATED APPLICATION

This application is based upon and claims priority from the Japanese Patent Application No. 2017-191772, filed on Sep. 29, 2017, the entire contents of which are incorporated herein by reference.

BACKGROUND OF THE INVENTION

1. Field of the Invention

The present invention relates to a vehicle body side part structure of a vehicle such as an automobile.

2. Description of the Related Art

For example, Patent document 1 (Japanese Unexamined Patent Application Publication No. 2016-2925) discloses a vehicle body side part structure in which a center pillar of an outer panel is divided into two parts in the up-down direction and a joint part between the two parts is coated by a photocurable resin.

Moreover, in the vehicle body side part structure disclosed in Patent document 1, a roof side rail outer and a center pillar outer are fixed to each other by spot-welding the joint part between them on five faces.

Incidentally, in the case where the joint part of the center pillar is coated by a photocurable resin, the part coated is hidden behind the door when the door is closed, but the part coated by the photocurable resin is brought into a visible state when the door is opened. For this reason, further improvement in appearance of the joint part is required even when the door is opened.

In order to further improve appearance designability of the joint part as compared to the case where the joint part is coated by a photocurable resin, it is conceived of, for example, that the joint part is brazed. However, when the roof side rail outer and the center pillar outer are brazed to each other on many restricted faces such as five faces, problems arise in that joining faces that are brazed are deviated from each other to cause a variation between the joining faces.

The present invention has therefore been made in view of the above problems, and an object of the present invention is to provide a vehicle body side part structure capable of improving appearance designability of a vehicle body and suppressing a variation in joint parts of an integrally-joined center pillar.

SUMMARY OF THE INVENTION

In order to attain the above object, according to an aspect of the present invention, a vehicle body side part structure reflecting one aspect of the present invention includes a side outer panel provided at an outer side of a vehicle body, wherein the side outer panel includes a roof side rail outer provided at an outer side of a roof, and a center pillar outer provided at an outer side of a center pillar; the roof side rail outer includes a downward extension part extending downward; the downward extension part includes a pair of flange parts located at a vehicle front side and a vehicle rear side of the downward extension part, respectively, a pair of side wall parts extending outward in a vehicle width direction from the pair of flange parts, respectively, and an extended wall part located between the pair of side wall parts and connecting the pair of side wall parts to each other; and lower end parts of the pair of side wall parts and a lower end part of the extended wall part extend downward in an up-down direction of the vehicle from lower end parts of the pair of flange parts, respectively.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

Hereinafter, embodiments of the present invention will be described in detail with reference to the drawings as necessary.

Note that "front-rear", "up-down", and "right-left" indicated by arrows in each figure indicate a front-rear direction of a vehicle, an up-down direction of the vehicle, and a right-left direction (vehicle width direction) viewed from a driver's seat, respectively.

Figure 1:
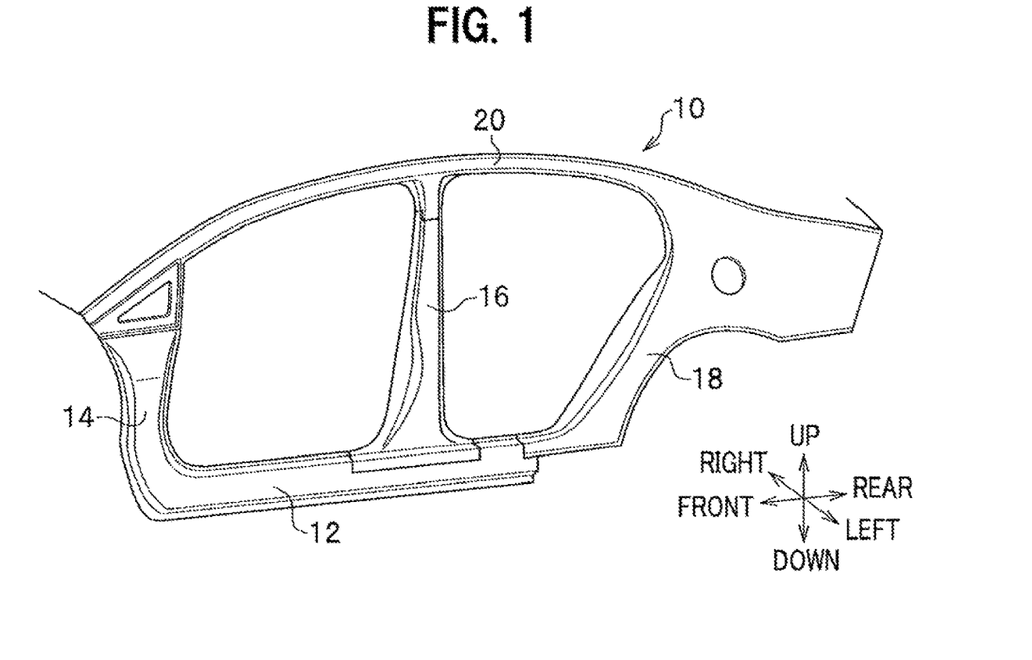
FIG. 1 is a perspective view showing a vehicle body side part of a vehicle to which a vehicle body side part structure according to an embodiment of the present invention is applied.

As shown in FIG. 1, a vehicle body side part 10 of a vehicle to which a vehicle body side part structure according to an embodiment of the present invention is applied is provided with a side sill 12, a front pillar 14, a center pillar 16 and a rear pillar 18. The side sill 12 is disposed below the vehicle body side part 10 and supports a side part of a floor panel (not shown). The front pillar 14 is provided to stand on an end part on a vehicle front side of the side sill 12. The center pillar 16 is provided to stand on a central part of the side sill 12. The rear pillar 18 is provided to stand on an end part on a vehicle rear side of the side sill 12.

Figure 3:
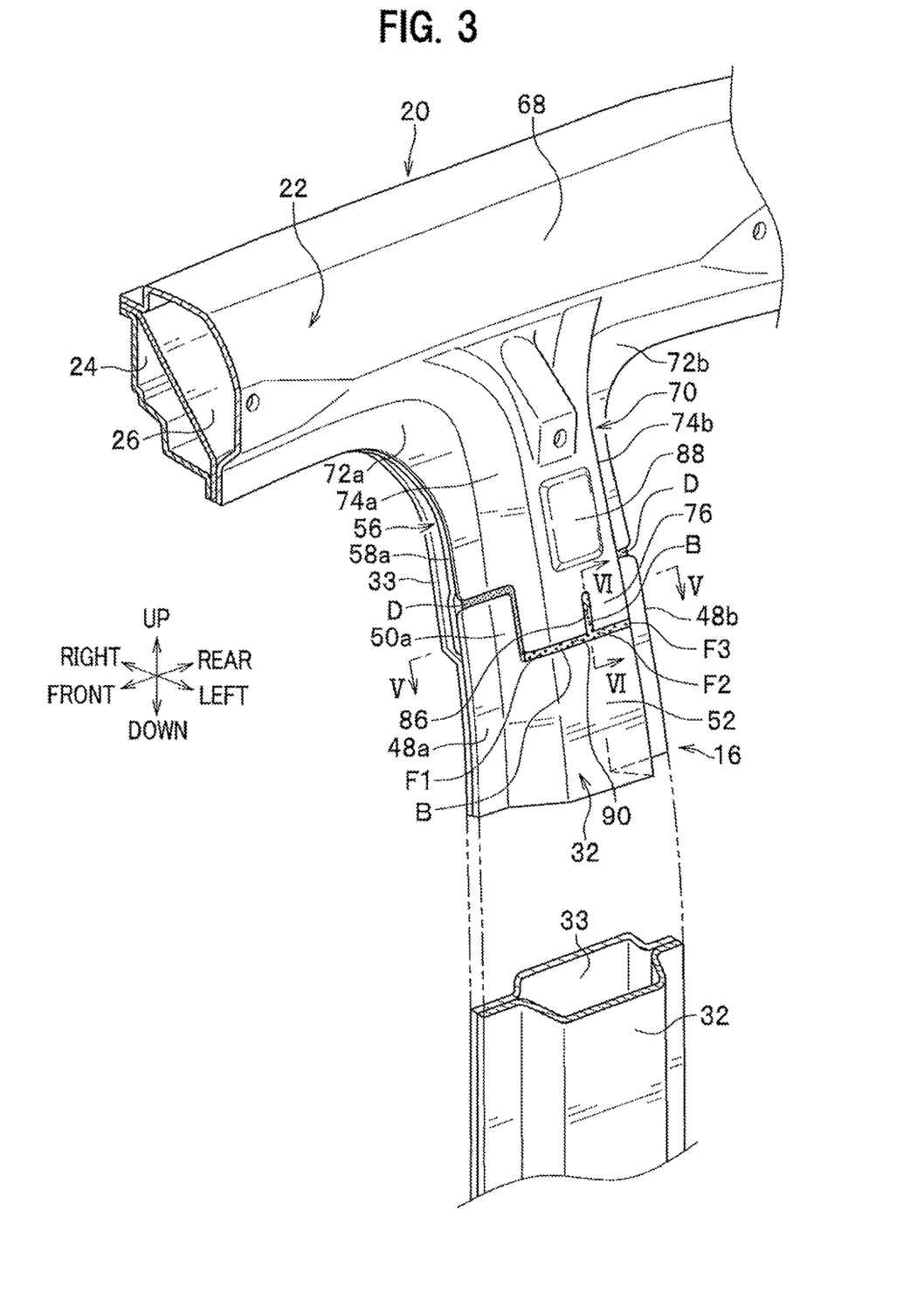
FIG. 3 is a partially broken and enlarged perspective view of a main part shown in FIG. 1.

Moreover, a roof side rail 20 extending along the front-rear direction of the vehicle is connected to each of upper end parts of the front pillar 14, the center pillar 16 and the rear pillar 18. As shown in FIG. 3, the roof side rail 20 is composed of a roof side rail outer 22, a roof side rail inner 24 and a roof side rail stiffener 26.

The roof side rail outer 22 is provided at an outer side of the roof and formed of, for example, a general steel plate having good press moldability. The roof side rail inner 24 is provided on an inner side of the roof. The roof side rail stiffener 26 is provided between the roof side rail outer 22 and the roof side rail inner 24. The roof side rail outer 22 and the roof side rail inner 24 are joined together via a flange (not shown), thereby forming a closed cross section.

Figure 2:
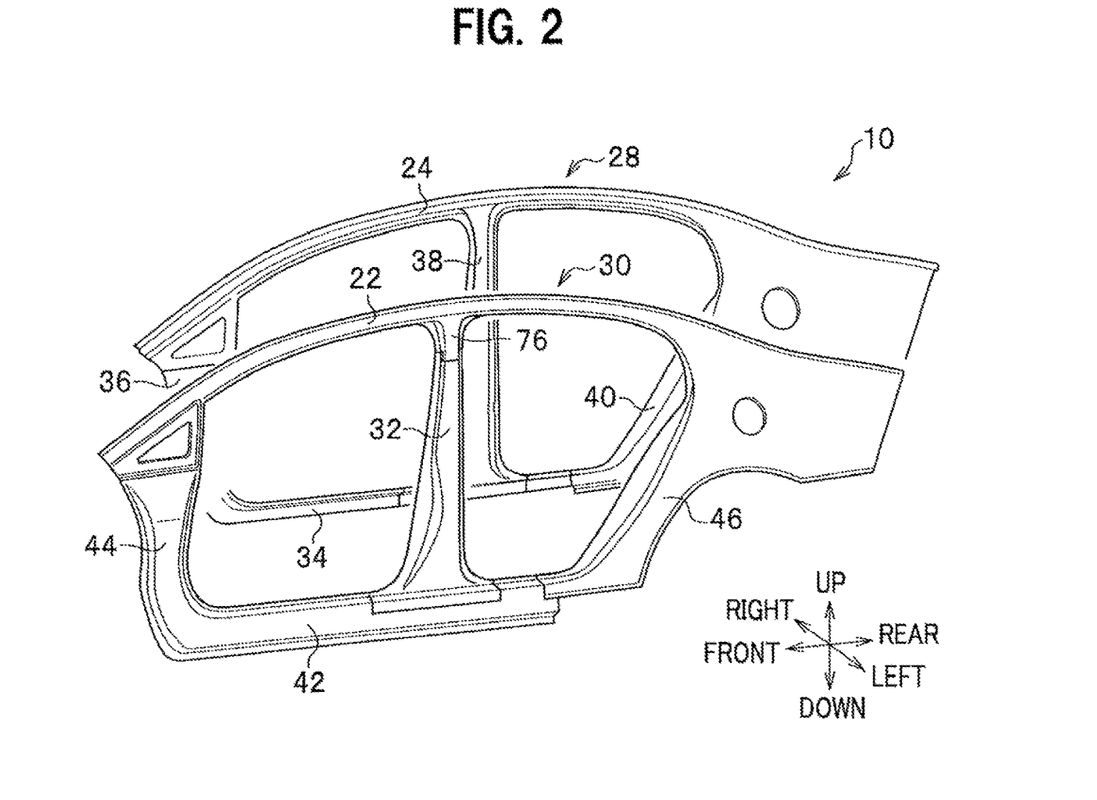
FIG. 2 is an exploded perspective view of the vehicle body side part shown in FIG. 1, which is decomposed into a side inner panel and a side outer panel.

As shown in FIG. 2, the vehicle body side part 10 is provided with a side inner panel 28 provided at the inner side of the vehicle body side part 10, and a side outer panel 30 provided at the outer side of the vehicle body side part 10. The side outer panel 30 is integrally joined to the side inner panel 28 from the vehicular outside.

The side inner panel 28 is a panel that composes an inner side wall of the vehicle body side part structure. The side inner panel 28 includes a side sill inner 34, a front pillar inner 36, a center pillar inner 38, a rear pillar inner 40, and the roof side rail inner 24.

The side outer panel 30 is a panel that composes an outer side wall of the vehicle body side part structure. The side outer panel 30 includes a side sill outer 42, a front pillar outer 44, a center pillar outer 32, a rear pillar outer 46, and the roof side rail outer 22.

Hereinafter, the side outer panel 30 will be described in detail based on the center pillar outer 32, the roof side rail outer 22 and the roof side rail stiffener 26. Moreover, the side outer panel 30 is configured by integrally joining a center pillar upper part and a center pillar main part to each other on the upper part side of the center pillar 16, the center pillar upper part and the center pillar main part being configured by two parts divided in advance.

Figure 4:
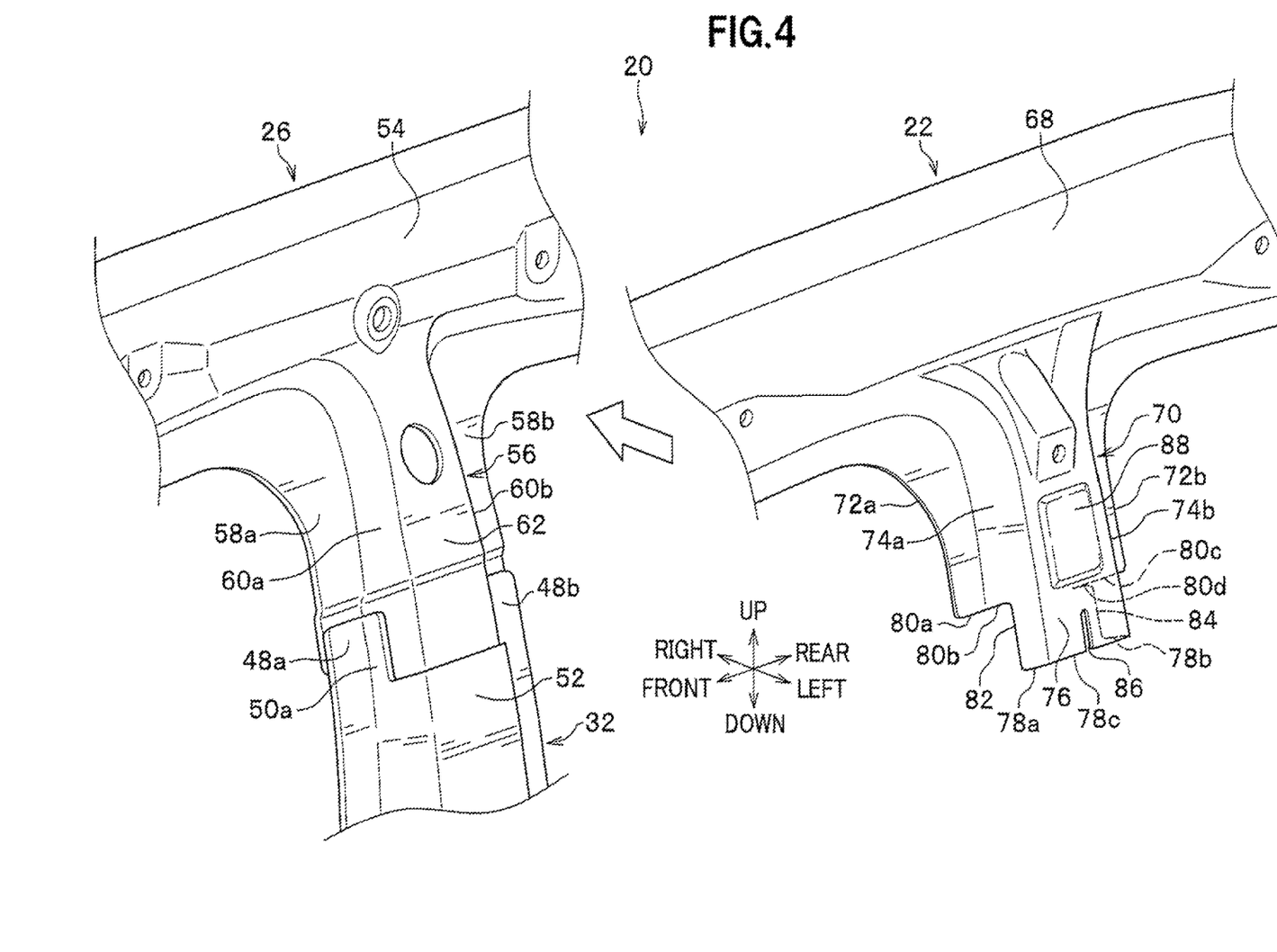
FIG. 4 is an exploded perspective view of a roof side rail shown in FIG. 3, which is decomposed into a roof side rail outer and a roof side rail stiffener.

As shown in FIG. 3 and FIG. 4, the center pillar upper part is configured by integrally joining a downward extension part 70 (to be described below) of the roof side rail outer 22 and a stiffener extension part 56 of the roof side rail stiffener 26 to each other. As shown in FIG. 3, the center pillar main part includes the center pillar outer 32 having a nearly hat-shaped cross section and the center pillar inner 33 having a nearly hat-shaped cross section. The center pillar main part is configured by a hollow section formed by integrally joining flange parts of the center pillar outer 32 and the center pillar inner 33 to each other.

The center pillar outer 32 has an upper end part connected to the stiffener extension part 56 of the roof side rail stiffener 26 (see FIG. 4), and a lower end part connected to a central part of the side sill outer 42 (see FIG. 2). The center pillar outer 32 is formed of, for example, a high-strength steel plate (high-tensile steel plate) having a higher tensile strength than a general steel plate.

Figure 5:
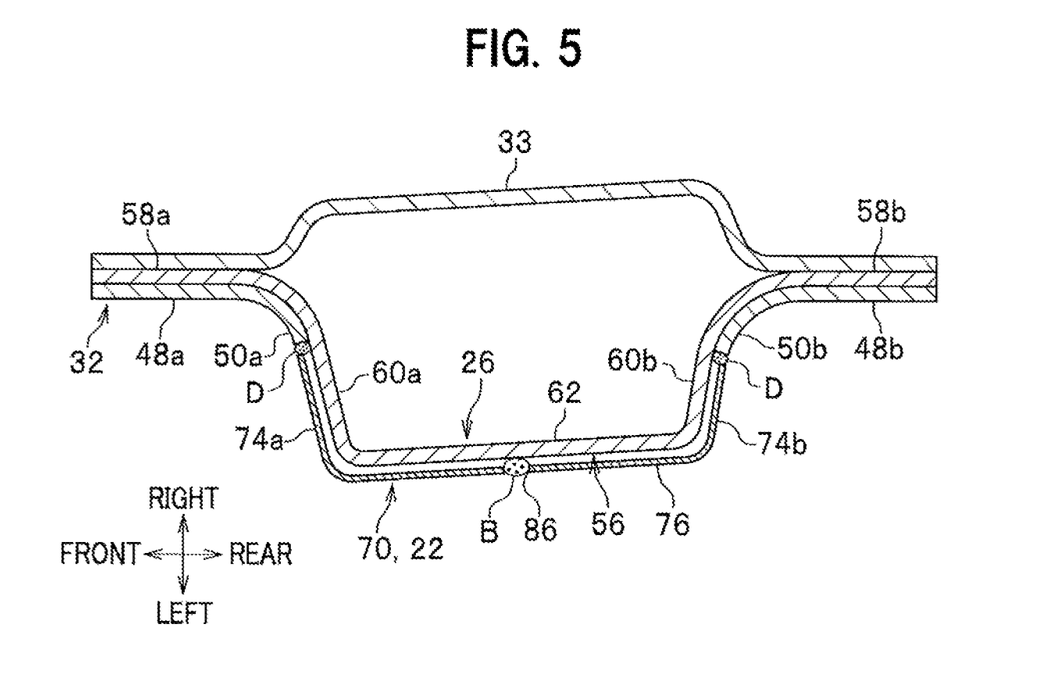
FIG. 5 is a cross section view taken along line V-V in FIG. 3.

As shown in FIG. 5, the center pillar outer 32 includes a front side flange part 48a and a rear side flange part 48b, a front-side side wall part 50a and a rear-side side wall part 50b, and a central side wall part 52 (also see FIG. 3 and FIG. 4). The front side flange part 48a protrudes toward the vehicle front side and extends along the up-down direction of the vehicle. The rear side flange part 48b protrudes toward the vehicle rear side and extends along the up-down direction of the vehicle. The central side wall part 52 extends in a belt shape along the up-down direction of the vehicle and connects to each other the front side flange part 48a and the rear side flange part 48b that are disposed at the vehicle front side and the vehicle rear side, respectively.

As shown in FIG. 4, the roof side rail stiffener 26 includes a stiffener body part 54 and the stiffener extension part 56 that extends downward from the stiffener body part 54. The stiffener body part 54 extends in the front-rear direction of the vehicle along the roof side rail outer 22 (see FIG. 3) and the roof side rail inner 24.

As shown in FIG. 5, the stiffener extension part 56 includes a pair of stiffener flange parts 58a, 58b, a pair of stiffener side wall parts 60a, 60b, and a stiffener extended wall part 62 (also see FIG. 4). The pair of stiffener flange parts includes a front side stiffener flange part 58a located at the vehicle front side of the stiffener extended wall part 62, and a rear side stiffener flange part 58b located at the vehicle rear side of the stiffener extended wall part 62. The pair of stiffener side wall parts includes a front side stiffener side wall part 60a that connects the front side stiffener flange part 58a and the stiffener extended wall part 62 to each other, and a rear side stiffener side wall part 60b that connects the rear side stiffener flange part 58b and the stiffener extended wall part 62 to each other.

The stiffener extension part 56 is integrally joined to the center pillar outer 32, for example, by means of welding equipment, with a lower end part of the stiffener extension part 56 being overlapped from the inside with the upper end part of the center pillar outer 32.

The roof side rail outer 22 includes a rail outer body part 68 and the downward extension part 70 that extends downward in the up-down direction of the vehicle from the rail outer body part 68. The downward extension part 70 includes a pair of flange parts (a front side flange part 72a and a rear side flange part 72b to be described below), a pair of side wall parts (a front-side side wall part 74a and a rear-side side wall part 74b to be described below), and an extended wall part 76.

As shown in FIG. 3 and FIG. 4, the pair of flange parts includes the front side flange part 72a located at the vehicle front side of the extended wall part 76, and the rear side flange part 72b located at the vehicle rear side of the extended wall part 76. The pair of side wall parts includes the front-side side wall part 74a that connects the front side flange part 72a and the extended wall part 76 to each other, and the rear-side side wall part 74b that connects the rear side flange part 72b and the extended wall part 76 to each other.

As shown in FIG. 4, one partial lower end part 78a of the front-side side wall part 74a, one partial lower end part 78b of the rear-side side wall part 74b, and a lower end part 78c of the extended wall part 76 extend downward in the up-down direction of the vehicle from a lower end part 80a of the front side flange part 72a, the other partial lower end part 80b of the front-side side wall part 74a, a lower end part 80c of the rear side flange part 72b, and the other partial lower end part 80d of the rear-side side wall part 74b, respectively. Note that one partial lower end part 78a of the front-side side wall part 74a and one partial lower end part 78b of the rear-side side wall part 74b function as "lower end parts of a pair of side wall parts" described in the claims.

In the downward extension part 70 of the roof side rail outer 22, a part on the lower end side of the front side flange part 72a and a part on the lower end side of the front-side side wall part 74a are cut out in a rectangular shape, respectively, to form a front side cut-out part 82. Moreover, a part on the lower end side of the rear side flange part 72b and a part on the lower end side of the rear-side side wall part 74b are cut out in a rectangular shape, respectively, to form a rear side cut-out part 84.

Providing the front side cut-out part 82 and the rear side cut-out part 84 allows one partial lower end part 78a of the front-side side wall part 74a, one partial lower end part 78b of the rear-side side wall part 74b, and the lower end part 78c of the extended wall part 76 to be disposed at the lower side in the up-down direction of the vehicle, as compared to the other parts (the lower end part 80a of the front side flange part 72a, the other partial lower end part 80b of the front-side side wall part 74a, the lower end part 80c of the rear side flange part 72b, and the other partial lower end part 80d of the rear-side side wall part 74b). Moreover, in the front side cut-out part 82, the front side flange part 48a and the front-side side wall part 50a of the center pillar outer 32 are disposed, and in the rear side cut-out part 84, the rear side flange part 48b and the rear-side side wall part 50b of the center pillar outer 32 are disposed.

Note that one partial lower end part 78a of the front-side side wall part 74a, one partial lower end part 78b of the rear-side side wall part 74b, and the lower end part 78c of the extended wall part 76 are formed to have the same length in the up-down direction of the vehicle, respectively. Moreover, the lower end part 80a of the front side flange part 72a and the lower end part 80c of the rear side flange part 72b are formed to have the same length in the up-down direction of the vehicle, respectively.

The downward extension part 70 of the roof side rail outer 22 and the stiffener extension part 56 of the roof side rail stiffener 26 are integrally joined to each other to compose the center pillar upper part. The downward extension part 70 and the stiffener extension part 56 allow a pair of flange parts corresponding to each other (corresponding front side flange parts and corresponding rear side flange parts) to be integrally joined to each other, for example, by means of spot welding or the like.

In the center of the lower end part 78c of the extended wall part 76, a slit 86 is formed which rises from the lower edge toward the vehicle upper side. The slit 86 is filled with braze B that is brazed. Note that the slit 86 is not necessarily provided.

Above the slit 86 and on the central part of the extended wall part 76, a bead 88 is provided which has a nearly rectangular shape when viewed from the outside. The bead 88 is formed of a protruded part that protrudes outward. Note that, although in the present embodiment the bead 88 is provided on the downward extension part 70 of the roof side rail outer 22, such a bead may be provided, for example, on the roof side rail stiffener 26. That is to say, the bead 88 only needs to be provided on either one of the roof side rail outer 22 and the roof side rail stiffener 26.

Figure 6:
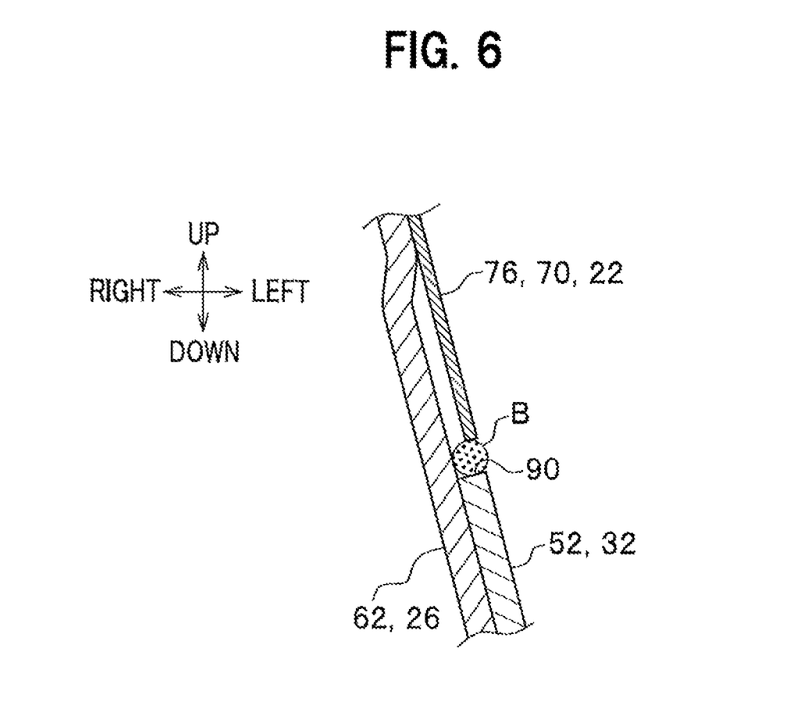
FIG. 6 is a longitudinal section view taken along line VI-VI in FIG. 3.

As shown in FIG. 3 and FIG. 6, the roof side rail outer 22 and the center pillar outer 32 are disposed to face each other in the up-down direction with a clearance 90 between the lower edge of the roof side rail outer 22 and the upper edge of the center pillar outer 32. In other words, a butted structure is formed which allows the lower edge of the roof side rail outer 22 and the upper edge of the center pillar outer 32 to be exposed to the outside and to be butted each other via the clearance 90. Note that the clearance 90 is filled with the braze B that is brazed.

As shown in FIG. 3 and FIG. 4, between the lower end part 80a of the front side flange part 72a and the lower end part 80c of the rear side flange part 72b, and the upper end part of the center pillar outer 32, a clearance is formed along the front-rear direction of the vehicle. Moreover, between the other partial lower end part 80b of the front-side side wall part 74a and the other partial lower end part 80d of the rear-side side wall part 74b, and the upper end part of the center pillar outer 32, a clearance is formed along the front-rear direction of the vehicle. These clearances are filled with a dust sealer D, respectively.

Between the side edge part on the vehicle front side of the front-side side wall part 74a and the side edge part on the vehicle rear side of the center pillar outer 32, a clearance is formed along the up-down direction of the vehicle. Moreover, between the side edge part on the vehicle rear side of the rear-side side wall part 74b and the side edge part on the vehicle front side of the center pillar outer 32, a clearance is formed along the up-down direction of the vehicle. These clearances are located at the vehicle front side and the vehicle rear side, respectively, and disposed to face each other and to be in almost parallel to each other. These clearances are filled with the dust sealer D, respectively.

The vehicle body side part 10 of the vehicle to which the vehicle body side part structure according to the present embodiment is applied is basically configured as described above, and the operation and effects thereof will be described below.

In the present embodiment, one partial lower end part 78a of the front-side side wall part 74a, one partial lower end part 78b of the rear-side side wall part 74b, and the lower end part 78c of the extended wall part 76 extend downward in the up-down direction of the vehicle from the lower end part 80a of the front side flange part 72a, and the lower end part 80c of the rear side flange part 72b, respectively. Consequently, the present embodiment makes it possible to easily perform brazing to three faces (see F1, F2 and F3 in FIG. 3) that define the clearances formed between the lower end of the roof side rail outer 22 and the upper end of the center pillar outer 32.

As a result, the present embodiment makes it possible to easily braze the requisite and minimum part that is easy to catch the eye from the outside, and to suppress a variation between the joining faces. In other words, the present embodiment allows brazing to be performed to the three faces (see F1, F2 and F3 in FIG. 3) along which a door seal line of a door-side sealing member passes, thereby making it possible to easily perform brazing to the requisite and minimum part.

Thus, the present embodiment makes it possible to improve appearance designability of the vehicle body and to suppress a variation between the joining faces in the joint parts of the center pillar 16 that is configured by two parts divided in advance.

In the present embodiment, brazing is performed not only to the lower end part 78c of the extended wall part 76, but also to one partial lower end part 78a of the front-side side wall part 74a and one partial lower end part 78b of the rear-side side wall part 74b. Consequently, the present embodiment makes it possible to improve appearance designability of the vehicle body and to suppress a step difference at the joining faces of the divided parts with which the door-side sealing member is elastically contacted, by means of the braze B that is brazed. As a result, the present embodiment makes it possible, for example, even if the roof side rail outer 22 is formed of a general steel plate and the center pillar outer 32 is formed of a high-strength steel plate, to reduce the step difference at the joining faces of the divided parts to suppress local reduction in a sealing force of the door-side sealing member.

In the present embodiment, the slit 86 extending along the up-down direction of the vehicle is provided at the lower end part 78c of the extended wall part 76. Consequently, the present embodiment makes it possible to absorb a variation of the joining faces between one partial lower end part 78a of the front-side side wall part 74a and one partial lower end part 78b of the rear-side side wall part 74b which are brazed in the front-rear direction of the vehicle, through the slit 86 located between the front-side side wall part 74a and the rear-side side wall part 74b.

In the present embodiment, the roof side rail outer 22 and the center pillar outer 32 form a butted structure such that they are disposed to face each other in the up-down direction with the clearance 90 between the lower edge of the roof side rail outer 22 and the upper edge of the center pillar outer 32. For example, in order to enhance strength of the center pillar outer 32, a case where the center pillar outer 32 is formed of hot stamp materials having a high melting point or a case where the outer surface of the center pillar outer 32 is plated is conceived of. Even in such cases, the present embodiment makes it possible to allow the braze B that is brazed, to be easily melted, and thus to easily perform brazing, because the lower edge of the roof side rail outer 22 and the upper edge of the center pillar outer 32, which are base materials, are exposed to the outside (i.e., not plated).

In the present embodiment, the bead 88 formed of a rectangular protruded part protruding outward is provided on the downward extension part 70 (the extended wall part 76) of the roof side rail outer 22. Consequently, the present embodiment makes it possible to enhance surface rigidity of the roof side rail outer 22.

Figure 7:
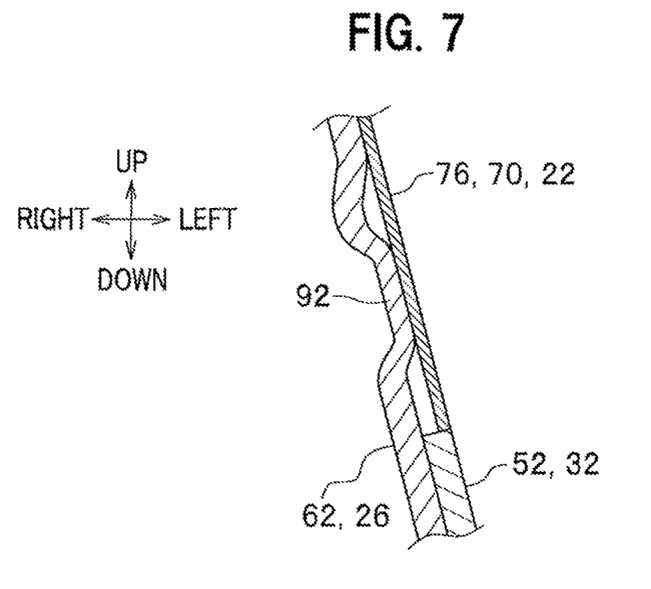
FIG. 7 is a longitudinal section view showing a modification of a bead.

Moreover, as shown in FIG. 7, where the roof side rail stiffener 26 has a bearing surface 92 (bead) provided thereon, which is thinly formed and bulged outward, influence by thermal distortion at the time of brazing can be suppressed. Note that, as construction methods for changing a plate thickness of the bearing surface 92 of the roof side rail stiffener 26, for example, a TB (Tailored Blanks) construction method can be employed in which different steel plates are connected together to form the roof side rail stiffener 26.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

10: Vehicle body side part; 16: Center pillar; 22: Roof side rail outer; 26: Roof side rail stiffener; 30: Side outer panel; 32: Center pillar outer; 70: Downward extension part; 72a: Front side flange part (Pair of flange parts); 72b: Rear side flange part (Pair of flange parts); 74a: Front-side side wall part (Pair of side wall parts); 74b: Rear-side side wall part (Pair of side wall parts); 76: Extended wall part; 86: Slit; 88: Bead; 90: Clearance; B: Braze; D: Dust sealer

What is claimed is:

1. A vehicle body side part structure comprising a side outer panel provided at an outer side of a vehicle body, wherein
    the side outer panel includes a roof side rail outer provided at an outer side of a roof, and a center pillar outer provided at an outer side of a center pillar;
    the roof side rail outer includes a downward extension part extending downward;
    the downward extension part includes a pair of flange parts located at a vehicle front side and a vehicle rear side of the downward extension part, respectively, a pair of side wall parts extending outward in a vehicle width direction from the pair of flange parts, respectively, and an extended wall part located between the pair of side wall parts and connecting the pair of side wall parts to each other;
    lower end parts of the pair of side wall parts and a lower end part of the extended wall part extend downward in an up-down direction of the vehicle from lower end parts of the pair of flange parts, respectively;
    the extended wall part has a slit provided at a lower end part thereof, the slit extending along the up-down direction of the vehicle.

2. The vehicle body side part structure according to claim 1, wherein
    each of the flange parts, each of the side wall parts, and the extended wall part are continuously joined to the center pillar outer, with braze and a dust sealer.

3. The vehicle body side part structure according to claim 1, wherein
    the roof side rail outer and the center pillar outer are disposed to face each other in the up-down direction with a clearance between a lower edge of the roof side rail outer and an upper edge of the center pillar outer, and
    the clearance is filled with braze.

4. The vehicle body side part structure according to claim 1, wherein
    a roof side rail stiffener is disposed at an inner side of the roof side rail outer, and
    a bead is provided on either one of the roof side rail outer and the roof side rail stiffener.

5. The vehicle body side part structure according to claim 2, wherein
    the roof side rail outer and the center pillar outer are disposed to face each other in the up-down direction with a clearance between a lower edge of the roof side rail outer and an upper edge of the center pillar outer, and
    the clearance is filled with braze.

6. The vehicle body side part structure according to claim 2, wherein
    a roof side rail stiffener is disposed at an inner side of the roof side rail outer, and
    a bead is provided on either one of the roof side rail outer and the roof side rail stiffener.

7. The vehicle body side part structure according to claim 3, wherein
    a roof side rail stiffener is disposed at an inner side of the roof side rail outer, and
    a bead is provided on either one of the roof side rail outer and the roof side rail stiffener.

8. The vehicle body side part structure according to claim 5, wherein
    a roof side rail stiffener is disposed at an inner side of the roof side rail outer, and
    a bead is provided on either one of the roof side rail outer and the roof side rail stiffener.

9. A vehicle body side part structure comprising a side outer panel provided at an outer side of a vehicle body, wherein
    the side outer panel includes a roof side rail outer provided at an outer side of a roof, and a center pillar outer provided at an outer side of a center pillar;
    the roof side rail outer includes a downward extension part extending downward;
    the downward extension part includes a pair of flange parts located at a vehicle front side and a vehicle rear side of the downward extension part, respectively, a pair of side wall parts extending outward in a vehicle width direction from the pair of flange parts, respectively, and an extended wall part located between the pair of side wall parts and connecting the pair of side wall parts to each other;
    lower end parts of the pair of side wall parts and a lower end part of the extended wall part extend downward in an up-down direction of the vehicle from lower end parts of the pair of flange parts, respectively;
    the roof side rail outer and the center pillar outer are disposed to face each other in the up-down direction with a clearance between a lower edge of the roof side rail outer and an upper edge of the center pillar outer so as to form a butted structure;
the clearance is filled with braze; and
a joining part extending in the vehicle width direction is formed in a part of the butted structure.

\* \* \* \* \*